United States Patent
Inokuma

(10) Patent No.: US 10,528,338 B2
(45) Date of Patent: Jan. 7, 2020

(54) FIRMWARE DISTRIBUTION SYSTEM, DISTRIBUTION APPARATUS, FIRMWARE DISTRIBUTION METHOD AND PROGRAM RECORDING MEDIUM

(71) Applicant: NEC CORPORATION, Tokyo (JP)

(72) Inventor: Toshio Inokuma, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/452,929

(22) Filed: Mar. 8, 2017

(65) Prior Publication Data

US 2017/0277529 A1    Sep. 28, 2017

(30) Foreign Application Priority Data

Mar. 24, 2016   (JP) .................. 2016-060683

(51) Int. Cl.
| | |
|---|---|
| G06F 9/445 | (2018.01) |
| G06F 8/61 | (2018.01) |
| G06F 21/60 | (2013.01) |
| H04L 12/24 | (2006.01) |

(52) U.S. Cl.
CPC ............ *G06F 8/64* (2013.01); *G06F 21/60* (2013.01); *H04L 41/082* (2013.01); *G06F 2221/2111* (2013.01)

(58) Field of Classification Search
CPC ........... G06F 8/64; G06F 21/60; H04L 41/082
USPC ........................................ 717/175
See application file for complete search history.

(56) References Cited

U.S. PATENT DOCUMENTS

| | | | |
|---|---|---|---|
| 2004/0193745 A1* | 9/2004 | Olbricht ............... | G06F 3/1204 710/8 |
| 2006/0236325 A1* | 10/2006 | Rao ......................... | G06F 8/65 719/315 |
| 2008/0028046 A1* | 1/2008 | Ushiki ..................... | G06F 8/65 709/219 |
| 2008/0155368 A1* | 6/2008 | Bofferding ............... | G06F 8/65 714/746 |

(Continued)

FOREIGN PATENT DOCUMENTS

| | | |
|---|---|---|
| JP | 2011-175622 A | 9/2011 |
| JP | 2011-197791 A | 10/2011 |

OTHER PUBLICATIONS

Title: Remote progressive firmware update for flash-based networked embedded systems, author: Jinsik Kim et al, Published on Aug. 2009; source ACM/IEEE.*

(Continued)

*Primary Examiner* — Chameli Das
(74) *Attorney, Agent, or Firm* — Sughrue Mion, PLLC

(57) ABSTRACT

Disclosed are a firmware distribution system etc, including a first apparatus configured to send a firmware acquisition request and information regarding the installation location of the first apparatus; and a distribution apparatus configured to, when receiving the firmware acquisition request and the information regarding a installation location from the first apparatus via a network, distribute first firmware or second firmware depending on the information regarding the installation location to the first apparatus, the second firmware including the first firmware except a predetermined process of the first firmware.

6 Claims, 8 Drawing Sheets

(56) References Cited

U.S. PATENT DOCUMENTS

| | | | | |
|---|---|---|---|---|
| 2009/0063611 | A1* | 3/2009 | Igarashi | G06F 8/65 |
| | | | | 709/201 |
| 2010/0218178 | A1* | 8/2010 | Sakai | G06F 8/65 |
| | | | | 717/170 |
| 2012/0311042 | A1* | 12/2012 | Maruyama | H04L 67/34 |
| | | | | 709/204 |
| 2014/0214923 | A1* | 7/2014 | Ohashi | H04L 67/02 |
| | | | | 709/203 |
| 2014/0355049 | A1* | 12/2014 | Hadano | G06F 3/123 |
| | | | | 358/1.15 |
| 2015/0043029 | A1* | 2/2015 | Tsuboi | G06F 3/123 |
| | | | | 358/1.15 |
| 2015/0058401 | A1* | 2/2015 | Nakamoto | H04L 67/42 |
| | | | | 709/203 |
| 2017/0220404 | A1* | 8/2017 | Polar Seminario | G06F 8/654 |
| 2017/0235567 | A1* | 8/2017 | Marino | G06F 21/56 |
| | | | | 717/172 |
| 2018/0150293 | A1* | 5/2018 | Nachimuthu | H04L 41/0816 |
| 2018/0225459 | A1* | 8/2018 | Zarakas | G06F 8/654 |
| 2018/0253555 | A1* | 9/2018 | Schumacher | G06F 8/654 |

OTHER PUBLICATIONS

Title: Non-invasive rapid and efficient firmware update for wireless sensor networks, author: Hui Ung Park et al, published on Sep. 2014.*

* cited by examiner

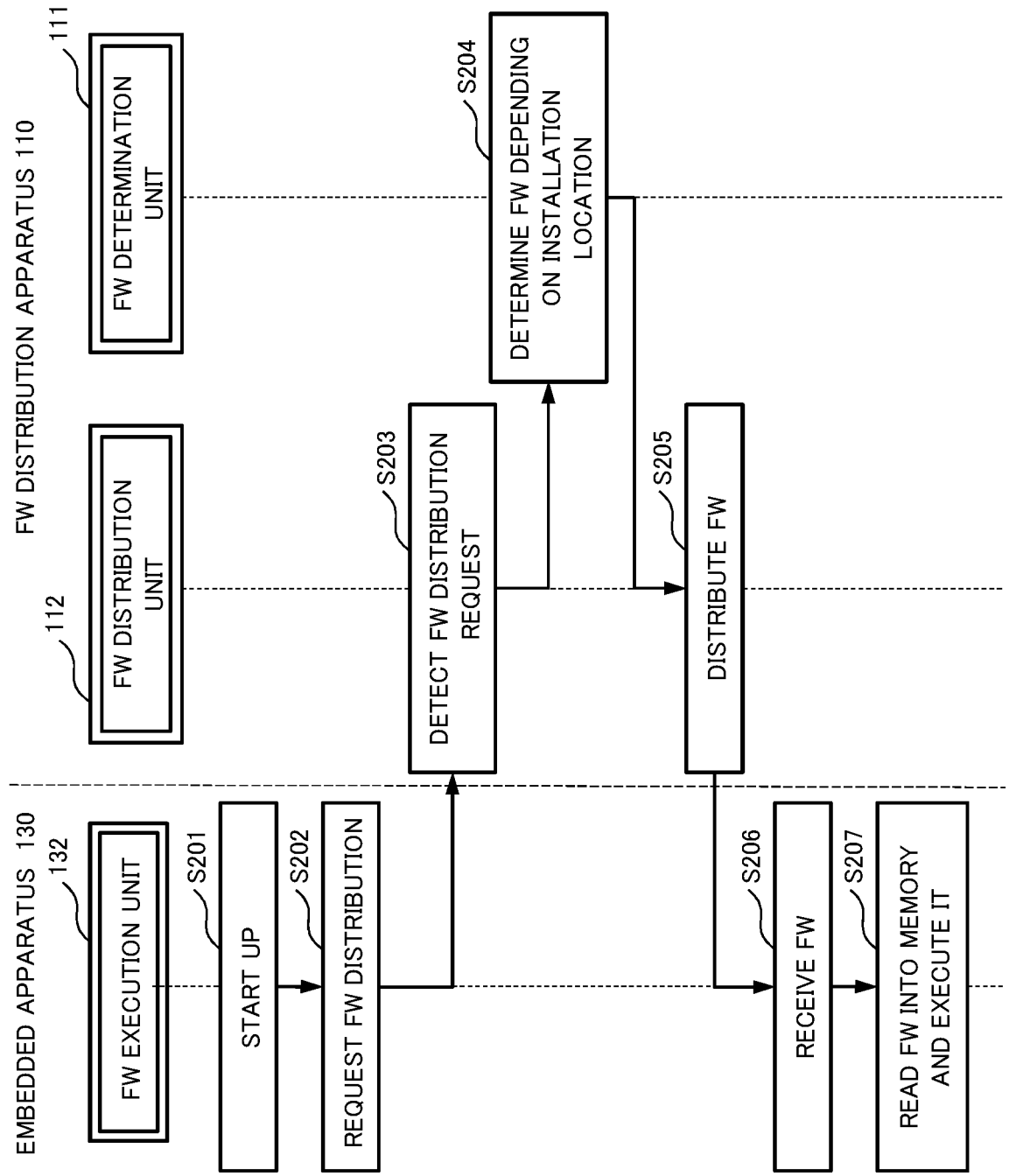

Fig. 4A

| SERIAL NUMBER | SHIPPING REGION NUMBER |
|---|---|
| 000001-000999 | 1 |
| 001000-001999 | 2 |
| 002000-002999 | 3 |

Fig. 4B

| SHIPPING REGION NUMBER | FW TYPE |
|---|---|
| 1 | NORMAL FW |
| 2 | NORMAL FW |
| 3 | ALTERNATIVE FW |

Fig. 4C

| FW TYPE | FILE NAME |
|---|---|
| NORMAL FW | FILE 1 |
| ALTERNATIVE FW | FILE 2 |

# FIRMWARE DISTRIBUTION SYSTEM, DISTRIBUTION APPARATUS, FIRMWARE DISTRIBUTION METHOD AND PROGRAM RECORDING MEDIUM

This application is based upon and claims the benefit of priority from Japanese Patent Application No. 2016-060683, filed on Mar. 24, 2016, the disclosure of which is incorporated herein in its entirety by reference.

TECHNICAL FIELD

The present invention relates to distribution of firmware.

BACKGROUND ART

With the rise of cloud services and services utilizing big data, there has been an increase of services which collect information from various kinds of equipment into a server and provide users with useful information. For example, a mechanism called IoT (Internet of Things) has come into use, where not only information and communication equipment such as computers but also a variety of things are provided with a communication function and, by making them connect to the internet and communicate with each other, automatic recognition, automatic control, telemetry, etc. are performed.

In the IoT, from such equipment having like the above described communication function (hereafter referred to also as "IoT equipment"), for example, position information obtained by the GPS (Global Positioning System), temperature information by a thermometer, an acceleration and a speed by an acceleration sensor, electric power consumption by a smart meter and the like are collected by a server. In the IoT, by collecting and analyzing an enormous amount of such data, useful information is provided for users.

In an embedded apparatus into which a specific function is incorporated in advance, such as the IoT equipment, the function is usually implemented by using not only the hardware but also firmware for controlling operation of the apparatus. There, it is often the case that the firmware is provided with an important logic for the embedded apparatus's fulfilling its function.

In recent years, as a result of that embedded apparatuses such as IoT equipment have become widely used in a variety of situations, there has been pointed out a problem of technology leaks by copying and analyzing firmware operating in the embedded apparatuses.

As a related technology, for example, Japanese Laid-Open Patent Application No. 2011-197791 (JP 2011-197791) discloses a program for management server which, at a time of firmware downloading by an information processing apparatus, can specify a server to be accessed by the information processing apparatus according to a region where the information processing apparatus is located.

Further, Japanese Laid-Open Patent Application No. 2011-175622 (JP 2011-175622) discloses a technology which enables a service provider technician to diagnose, repair and optimize a malfunctioning computing device, via firmware residing on the malfunctioning computing device.

SUMMARY

As described above, to make an embedded apparatus such as IoT equipment fulfill its function, firmware is written in the embedded apparatus in advance and is executed after being read into a memory. Accordingly, for some case of location where the embedded apparatus is installed, there is a issue in that technology leaks may be made by copying and analyzing the firmware written in the embedded apparatus.

JP 2011-197791 mentioned above discloses a technology of selecting a server, from among servers capable of communications, which stores firmware applicable to a multifunction machine, depending on an export regulation or the like of a located country. However, it does not disclose any technology for solving the risk of technology leaks.

No technology for solving the risk of technology leaks is disclosed in JP 2011-175622, either.

The present invention has been made in view of the above-described problem, and accordingly is aimed at providing a firmware distribution system and the like which is capable of preventing or reducing the risk of leakage of technology related to relevant apparatuses.

A firmware distribution system according to one aspect of the present invention includes:

a first apparatus which sends a firmware acquisition request and information regarding the installation location of the first apparatus; and a distribution apparatus which, when receiving the firmware acquisition request and the information regarding the installation location from the first apparatus via a network, distributes first firmware or second firmware depending on the information regarding the installation location, the second firmware including the first firmware except a predetermined process.

A distribution apparatus according to one aspect of the present invention includes:

a storage unit configured to store firmware information in which information regarding a installation location of a first apparatus which is communicable via a network, and a first firmware or second firmware depending on the installation location are correlated with either, the second firmware including the first firmware except a predetermined process; and a determination unit configured to, when receiving from the first apparatus via the network a firmware acquisition request and information regarding the installation location of the first apparatus, determine whether to distribute the first firmware or to distribute the second firmware, to the first apparatus, based on the received information regarding the installation location and the firmware information.

A firmware distribution method according to one aspect of the present invention includes:

sending a firmware acquisition request and information regarding the installation location of the first apparatus by a first apparatus; and when receiving the firmware acquisition request and the information regarding the installation location from the first apparatus via a network, distributing first firmware or second firmware depending on the information regarding the installation location by a distribution apparatus, the second firmware including the first firmware except a predetermined process.

A firmware distribution method according to one aspect of the present invention includes:

when receiving second firmware with being not included a predetermined process from a distribution apparatus via a network, controlling such that the predetermined process is executed by a substitute apparatus which is communicable via the network.

A non-transitory computer readable recording medium according to one aspect of the present invention stores a program for causing a computer to execute:

a process of storing, into a storage unit, firmware information in which information regarding a installation location of a first apparatus which is communicable via a network, and a first firmware or second firmware depending on the installation location are correlated with either, the second firmware including the first firmware except a predetermined process; and a process of, when receiving from the first apparatus via the network a firmware acquisition request and information regarding the installation location of the first apparatus, determine whether to distribute the first firmware or to distribute the second firmware, to the first apparatus, based on the received information regarding the installation location and the firmware information.

According to the present invention, it is possible to achieve an effect of enabling to provide a firmware distribution system and the like which is capable of preventing or reducing the risk of leakage of technology related to relevant apparatuses.

BRIEF DESCRIPTION OF THE DRAWINGS

Exemplary features and advantages of the present invention will become apparent from the following detailed description when taken with the accompanying drawings in which.

EXEMPLARY EMBODIMENT

Hereinafter, exemplary embodiments of the present invention will be described in detail, with reference to drawings.

First Exemplary Embodiment

Figure 1:
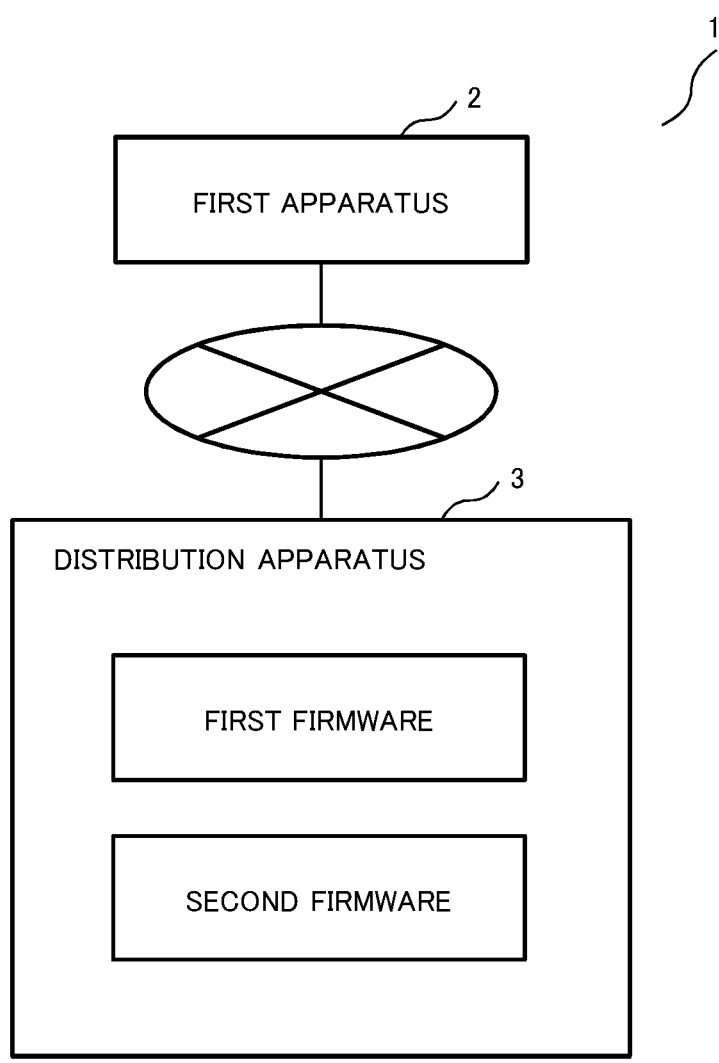
FIG. 1 a block diagram showing a configuration of a firmware distribution system according to a first exemplary embodiment of the present invention FIG. 2 a block diagram showing a configuration of a firmware distribution system according to a second exemplary embodiment of the present invention FIG. 3 a diagram showing operation of an FW distribution apparatus and an embedded apparatus in the firmware distribution system according to the second exemplary embodiment of the present invention FIG. 4A a diagram showing shipping region information stored in an FW storage unit of the firmware distribution system according to the second exemplary embodiment of the present invention FIG. 4B a diagram showing firmware information stored in the FW storage unit of the firmware distribution system according to the second exemplary embodiment of the present invention FIG. 4C a diagram showing files in each of which program codes of the corresponding firmware is described stored in the FW storage unit of the firmware distribution system according to the second exemplary embodiment of the present invention FIG. 5 a diagram showing operation performed when alternative firmware is received by the embedded apparatus in the firmware distribution system according to the second exemplary embodiment of the present invention FIG. 6 a diagram showing an example of a hardware configuration to implement apparatuses described in the exemplary embodiments.

FIG. 1 is a block diagram showing a configuration of a firmware distribution system 1 according to a first exemplary embodiment of the present invention. As shown in FIG. 1, the firmware distribution system 1 includes at least one first apparatus 2 and a distribution apparatus 3.

The first apparatus 2 is configured to send a firmware acquisition request and information regarding the installation location of the first apparatus 2.

The distribution apparatus 3 is configured to, when receiving the firmware acquisition request and the information regarding the installation location from the first apparatus 2 via a network, distribute first firmware or second firmware depending on the information regarding the installation location to the first apparatus 2, the second firmware including the first firmware except a predetermined process.

As a result of employing the configuration, according to the present first exemplary embodiment, it becomes possible to distribute firmware not including a predetermined process depending on the installation location of the first apparatus 2, and accordingly, an effect of enabling to prevent or reduce the risk of leakage of technology related to relevant apparatuses is achieved.

Second Exemplary Embodiment

Figure 2:
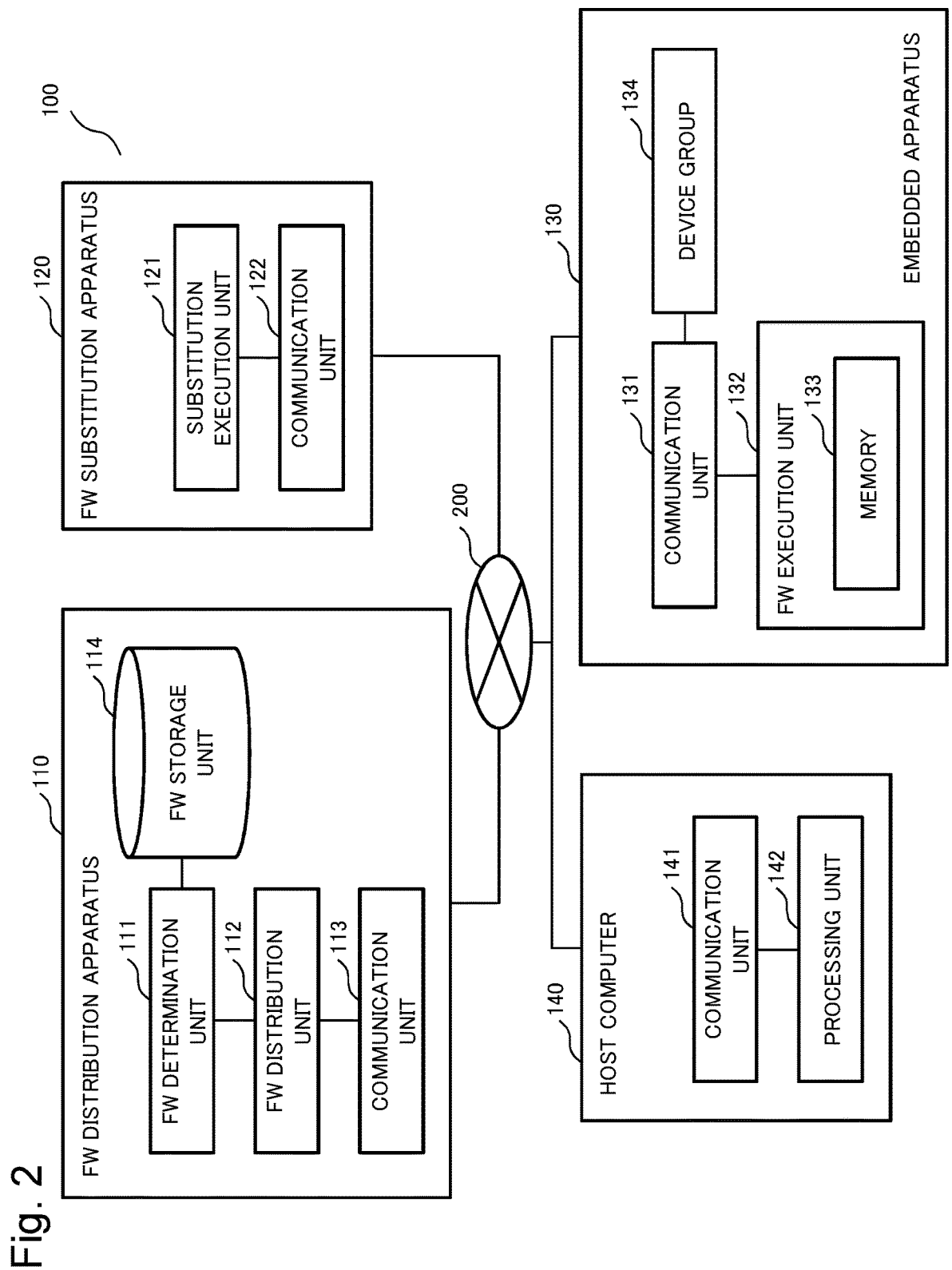

FIG. 2 is a block diagram showing a configuration of a firmware distribution system 100 according to a second exemplary embodiment of the present invention. The firmware distribution system 100 is constituted by an FW (FirmWare) distribution apparatus 110, an FW substitute apparatus 120 and an embedded apparatus 130 which are communicably connected with each other via a network 200. The FW substitute apparatus 120 may be included in the FW distribution apparatus 110. To the network 200, a host computer 140 may be communicably connected.

The FW distribution apparatus 110 includes a FW determination unit 111, an FW distribution unit 112, a communication unit 113 and an FW storage unit 114. The FW substitute apparatus 120 includes a substitution execution unit 121 and a communication unit 122. The embedded apparatus 130 includes a communication unit 131, an FW execution unit 132, a memory 133 and a device group 134. The host computer 140 includes a communication unit 141 and a processing unit 142.

The FW distribution apparatus 110, FW substitute apparatus 120, embedded apparatus 130 and host computer 140 communicate with each other via the network 200, by means of their respective communication units 113, 122, 131 and 141.

An outline of constituent elements of each of the apparatuses will be described below.

The embedded apparatus 130 is IoT equipment or the like, and includes the device group 134 for acquiring various kinds of information. The device group 134 includes, for example, a device for acquiring position information from the GPS, a device for acquiring temperature information from a thermometer, a device for acquiring image information from a surveillance camera, an acceleration sensor. The first apparatus is executed by, for example, the embedded apparatus 130.

The FW execution unit 132 sends to the FW distribution apparatus 110 an FW distribution request including information regarding its own installation location, and executes FW which is received in response to the FW distribution request, after reading it into the memory 133.

The FW distribution apparatus 110 is an apparatus for distributing firmware to the embedded apparatus 130. There, the FW distribution apparatus 110 determines firmware to distribute according to the installation location of the embedded apparatus 130. That is, the FW distribution apparatus 110 distributes firmware which is different depending on whether the embedded apparatus 130 is installed in a first region or a second region, the first region being determined as a region where there is a risk of technology leak, the second region being determined as a region where there is no such risk. Technology leaks can be prevented by means of not distributing firmware including a program code for an arithmetic process or the like to the embedded apparatus 130 installed in the region having a risk of technology leaks. The distribution apparatus is executed by, for example, the FW distribution apparatus 110.

The communication unit 113 of the FW distribution apparatus 110 notifies the FW distribution unit 112 of a FW distribution request received from the embedded apparatus 130 via the network 200. Receiving the FW distribution request, the FW distribution unit 112 notifies the FW determination unit 111 of the reception of the FW distribution request. On the basis of information included in the FW distribution request, the FW determination unit 111 determines whether to distribute normal firmware or to distribute alternative firmware, both stored in the FW storage unit 114 (details will be described later), to the embedded apparatus 130.

The FW substitute apparatus 120 is an apparatus which is correlated with the embedded apparatus 130 and executes a process to be normally executed by the firmware of the embedded apparatus 130 in place of the embedded apparatus 130 when the alternative firmware is distributed to the embedded apparatus 130. The substitution execution unit 121 executes the process based on the firmware of the embedded apparatus 130 in place of the embedded apparatus 130. The alternate apparatus is executed by, for example, the FW substitute apparatus 120.

The host computer 140 receives data from the FW substitute apparatus 120 or the embedded apparatus 130 with the communication unit 141 and executes a prescribed process in the processing unit 142.

It is assumed that the FW distribution apparatus 110 and the FW substitute apparatus 120 are installed in a country or region having no risk of technology leaks and that the embedded apparatus 130 is not necessarily installed in a country or region having no risk of technology leaks.

FIG. 3 is a diagram showing operation of the FW distribution apparatus 110 and the embedded apparatus 130. With reference to FIG. 3, operation of the FW distribution apparatus 110 and the embedded apparatus 130 will be described below.

After starting up (S201), the FW execution unit 132 of the embedded apparatus 130 sends an FW distribution request including information regarding its own installation location to the FW distribution apparatus 110, from the communication unit 131 via the network 200 (S202). Receiving the FW distribution request in the communication unit 113 via the network 200, the FW distribution apparatus 110 notifies the FW distribution unit 112 of the FW distribution request.

When detecting the FW distribution request (S203), the FW distribution unit 112 instructs the FW determination unit 111 to determine which firmware to be distributed. The FW determination unit 111 determines which firmware to be distributed, on the basis of the information regarding the installation location of the source embedded apparatus 130, the information being included in the FW distribution request (S204).

At that time, the FW determination unit 111 refers to shipping region information and firmware information stored in the FW storage unit 114. FIG. 4A is a diagram showing the shipping region information stored in the FW storage unit 114. FIG. 4B is a diagram showing the firmware information stored in the FW storage unit 114. FIG. 4C is a diagram showing file information according to the respective types of firmware is also stored in the FW storage unit 114.

Here, a description will be given of a case where the embedded apparatus 130 sends a serial number of product as information regarding its own installation location, to the FW distribution apparatus 110. In this case, a shipping region is determined in advance for each serial number of the embedded apparatus 130, and the type of firmware is determined in advance for each shipping region according to the presence or absence of a risk of technology leaks in the each region.

As shown in FIG. 4A, shipping region information including a range of the serial number and the shipping region number associated with each other is stored in the FW storage unit 114. Also in the FW storage unit 114, information regarding a type of firmware corresponding to each of the shipping region numbers is stored as shown in FIG. 4B. Files in each of which a program code of the corresponding firmware is described are also stored in the FW storage unit 114 as shown in FIG. 4C.

In the present case, there are two types of firmware, that is, normal firmware and alternative firmware. The normal firmware is an example of the first firmware and includes all (or almost all) functions necessary to realize the function of the embedded apparatus 130. The alternative firmware is an example of the second firmware. The alternative firmware includes only minimal functions determined in advance, such as an access functions to the device group 134 including sensors or the like, but not includes a predetermined process of the normal firmware, such as an operational process.

The FW determination unit 111 determines which firmware of the normal firmware and the alternative firmware to be distributed, on the basis of the serial number included in the FW distribution request. For example, when having acquired a serial number "002010", the FW determination unit 111 reads a shipping region number "3" from the shipping region information (FIG. 4A). Then, the FW determination unit 111 selects the "alternative firmware" from the firmware information (FIG. 4B), as the type of firmware corresponding to the shipping region number "3".

Subsequently, the FW distribution unit 112 distributes a file of the firmware selected by the FW determination unit 111 ("file 2", in the present case) to the embedded apparatus 130, from the communication unit 113 via the network 200 (S205).

In the embedded apparatus 130, on receiving the firmware in the communication unit 131 (S206), the FW execution unit 132 reads the firmware into the memory 133 and executes it (S207).

When receiving the normal firmware, the embedded apparatus 130 executes processes necessary to realize its own function all by itself, according to the normal firmware. The processes executed according to the normal firmware are, for example, a process of accessing the device group 134 such as sensors, that of an operation, that of data transfer to the external host computer 140 when necessary, and the like, similarly to those in common IoT equipment.

On the other hand, if the embedded apparatus 130 receives the alternative firmware, the processes necessary to realize the function of the embedded apparatus 130 are executed by the FW substitute apparatus 120. Accordingly, in that case where the alternative firmware has been distributed to the embedded apparatus 130, the FW substitute apparatus 120 and the embedded apparatus 130 operate by communicating with each other.

Therefore, the alternative firmware distributed to the embedded apparatus 130 includes a process in which the embedded apparatus 130 operates in cooperation with the FW substitute apparatus 120. Further, the FW substitute apparatus 120 is correlated with the embedded apparatus 130, and holds in advance a file or the like in which program codes are described, the program codes including a process to be normally executed in the embedded apparatus 130, such as an operational process, and a process for the cooperation with the embedded apparatus 130 (for example, an access process). In response to an instruction from the embedded apparatus 130, the substitution execution unit 121 executes the processes according to the program codes held as described above.

Figure 5:
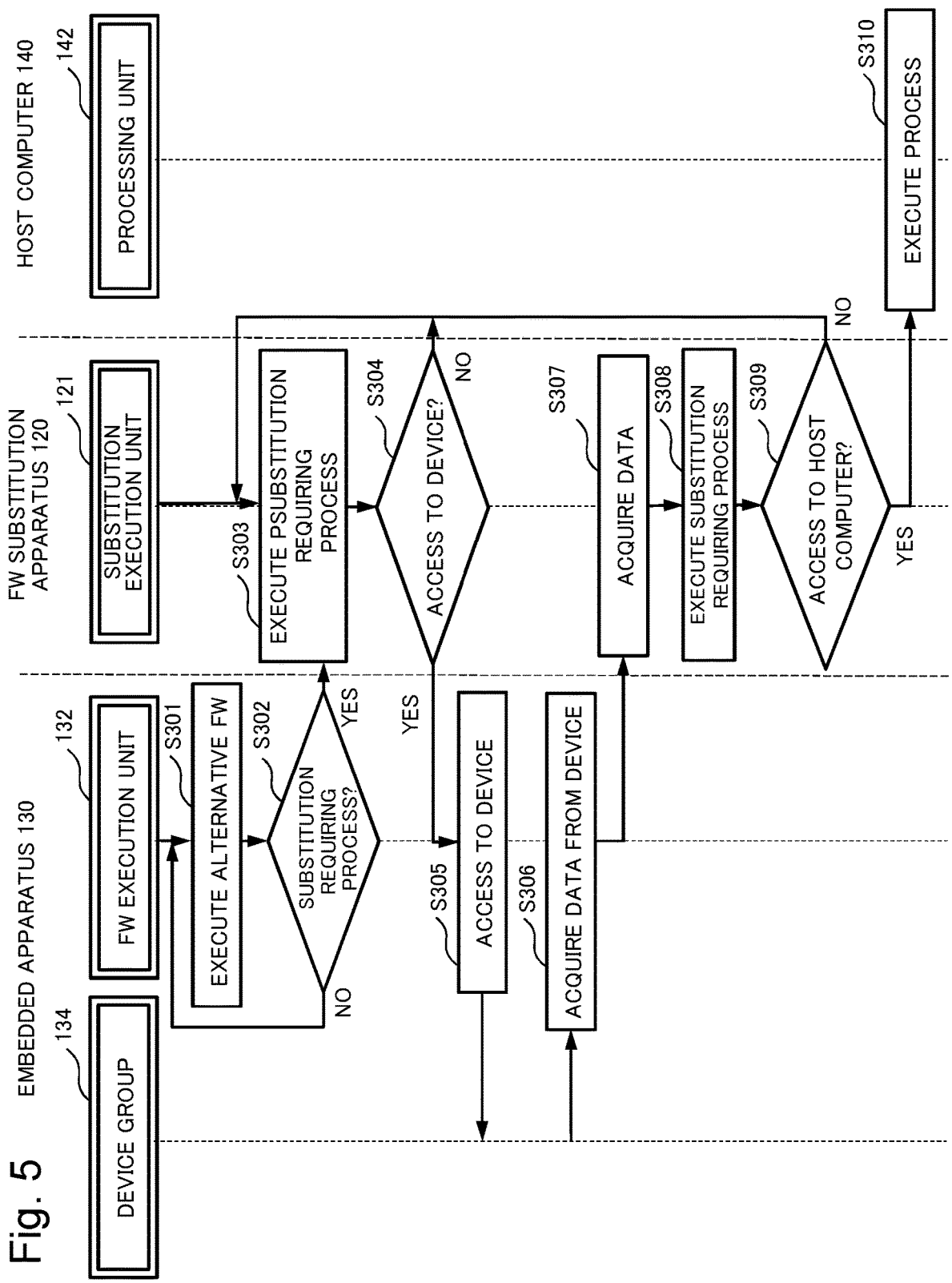

FIG. 5 is a diagram showing operation performed when the embedded apparatus 130 has received the alternative firmware. With reference to FIG. 5, a description will be given below of operation performed when the embedded apparatus 130 has received the alternative firmware.

The FW execution unit 132 in the embedded apparatus 130 executes the processes according to the received alternative firmware (S301). In the execution of the alternative firmware, when detecting a process requiring to be executed by the substitute apparatus (hereafter, referred to also as a "substitution requiring process"), such as an arithmetic process and the like, but other than an access process to the device group 134, (YES at S302), the FW execution unit 132 sends to the FW substitute apparatus 120 an instruction for executing the substitution requiring process. When the communication unit 122 receives the instruction, the FW substitute apparatus 120 executes the substitution required process in the substitution execution unit 121 (S303).

When detecting an access process to the device group 134 during the execution of the substitution requiring process (YES at S304), the substitution execution unit 121 instructs the embedded apparatus 130 to access the device group 134, from the communication unit 122 via the network 200.

In the embedded apparatus 130, receiving the instruction in the communication unit 131, the FW execution unit 132 executes the alternative firmware having been received from the FW distribution apparatus 110 which includes the access process to the device group 134. Accordingly, the FW execution unit 132 accesses the device group 134 (S305) and thereby acquires data from the device group 134 (S306).

The FW execution unit 132 sends the acquired data to the FW substitute apparatus 120 from the communication unit 131, by the execution of the alternative firmware. In the FW substitute apparatus 120, the substitution execution unit 121 acquires from the communication unit 122 the data acquired from the device group 134 (S307), and executes the substitution requiring process based on the program codes using the data (S308). When access to the device group 134 from the embedded apparatus 130 becomes necessary as a result of the substitution requiring process, the substitution execution unit 121 may request again the embedded apparatus 130 to access the device group 134.

When the substitution execution unit 121 detects an instruction for accessing the host computer 140, for example, a data sending instruction (YES at S309) in the execution of the substitution requiring process, the substitution execution unit 121 sends the data to the host computer 140 from the communication unit 122 via the network 200. The host computer 140 executes a process using the received data (S310).

Here, in such a case where the data needs to be sent to the host computer 140, a way of the data sending is not limited to the above-described one where the sending is made from the FW substitute apparatus 120 to the host computer 140. For example, the data sending may be performed such that the FW substitute apparatus 120 copies the data to send, to the alternative firmware which is under execution by the FW execution unit 132 of the embedded apparatus 130, and then the FW execution unit 132 sends the data to the host computer 140 by executing the alternative firmware.

As has been described above, according to the present second exemplary embodiment, depending on the installation location of the embedded apparatus 130, the FW distribution apparatus 110 distributes to the embedded apparatus 130 either the normal firmware or the alternative firmware, the normal firmware being implemented with all functions necessary to realize the function of the embedded apparatus 130, and the alternative firmware being implemented with only minimal functions such as the access process to the device group 134 including sensors or the like not being implemented an operational process or the like. When the alternative firmware has been distributed to the embedded apparatus 130, the processes necessary to realize the function of the embedded apparatus 130 are executed by the FW substitute apparatus 120.

As a result of employing that configuration, according to the present second exemplary embodiment, it is possible to achieve an effect that installing the embedded apparatus 130 even in a country or region where the installation has been difficult from the viewpoint of intellectual property protection while preventing technology leaks is possible.

Here, while it has been described above that the type of firmware is determined on the basis of the shipping region information and the firmware information both created in advance and stored in the FW storage unit 114, a way of the determination is not limited to the above-described one. For example, the FW determination unit 111 may identify a country or region into which the embedded apparatus 130 was shipped, on the basis of the network address of the embedded apparatus 130 corresponding to a source of an FW distribution request or the network address of an access point used for the connection to the network 200. In this case, the FW determination unit 111 may determine the type of the firmware depending on a country or region to which the shipping was made, according to predetermined rules by which the presence or absence of a risk of technology leaks has been determined for each country or region.

In an alternative case where a device capable of detecting the installation location of the embedded apparatus 130, such as a GPS device, is included in the device group 134 of the embedded apparatus 130, the FW execution unit 132 may acquire position information from the device in advance. Then, the FW execution unit 132 may send the acquired position information to the FW distribution apparatus 110, along with an FW distribution request. The position information, for example, may be the latitude and longitude of the embedded apparatus 130. In that case, according to prescriptions in which the presence or absence of a risk of technology information leaks is determined in advance in terms of the latitude and longitude, the FW determination unit 111 may determine to distribute the alternative firmware when the risk is present and to distribute the normal firmware when the risk is absent.

Further, while it has been described above that whether to distribute the normal firmware or to distribute the alternative firmware is determined after the installation of the embedded apparatus 130, a time for the determination is not limited to the above-described one. For example, the present exemplary embodiment can be applied also to operation checks or the like on the embedded apparatus 130 during a stage of its development where the hardware is produced in a foreign country and the firmware is developed at a domestic site.

In the development of an embedded apparatus such as an IoT equipment, there has been increased in the number of cases of instructing placing an order for development of the hardware, such as the apparatus's circuit itself and the like, to a foreign company offering a low cost, but in many cases, development of the firmware is carried out at a domestic own site of the company from the viewpoints of license issues, preventing technology leaks and the like.

In such cases, evaluation of firmware under development is carried out on an actual apparatus, and it accordingly is general to use a scheme of periodically importing an experimental product of the hardware to carry out the evaluation. However, in that case, there arises problems such as described below. That is, they are problems in that a large import cost is required and in that a lot of time is required for feeding back a fault of the hardware detected during the evaluation to the hardware supplier to whom the hardware development has been instructed.

In that case, the cost can be reduced by employing the firmware distribution system 100. That is, when evaluating hardware of the embedded apparatus 130 under development in a foreign country, the FW distribution apparatus 110 distributes the alternative firmware to the embedded apparatus 130.

Then, the FW substitute apparatus 120 installed in a domestic site is caused to execute processes of firmware which are to be normally executed by the embedded apparatus 130, such as described above. By this operation, it becomes possible to solve the above-described problems and to prevent or reduce the risk of leakage of the firmware technology.

Here, in that case, the FW execution unit 132 becomes unnecessary after completion of the hardware development of the embedded apparatus 130. Accordingly, the embedded apparatus 130 is shipped after writing the normal firmware into it.

It has been described that, in the above-described firmware distribution system 100 in the present exemplary embodiment, one FW substitute apparatus 120 and one embedded apparatus 130 are included, but the configuration of the firmware distribution system 100 is not limited thereto. The firmware distribution system 100 may include a plurality of embedded apparatuses 130 and also include a corresponding number of FW substitute apparatuses 120. Alternatively, one FW substitute apparatus 120 may execute a substitute process for each of a plurality of embedded apparatuses 130.

Figure 6:
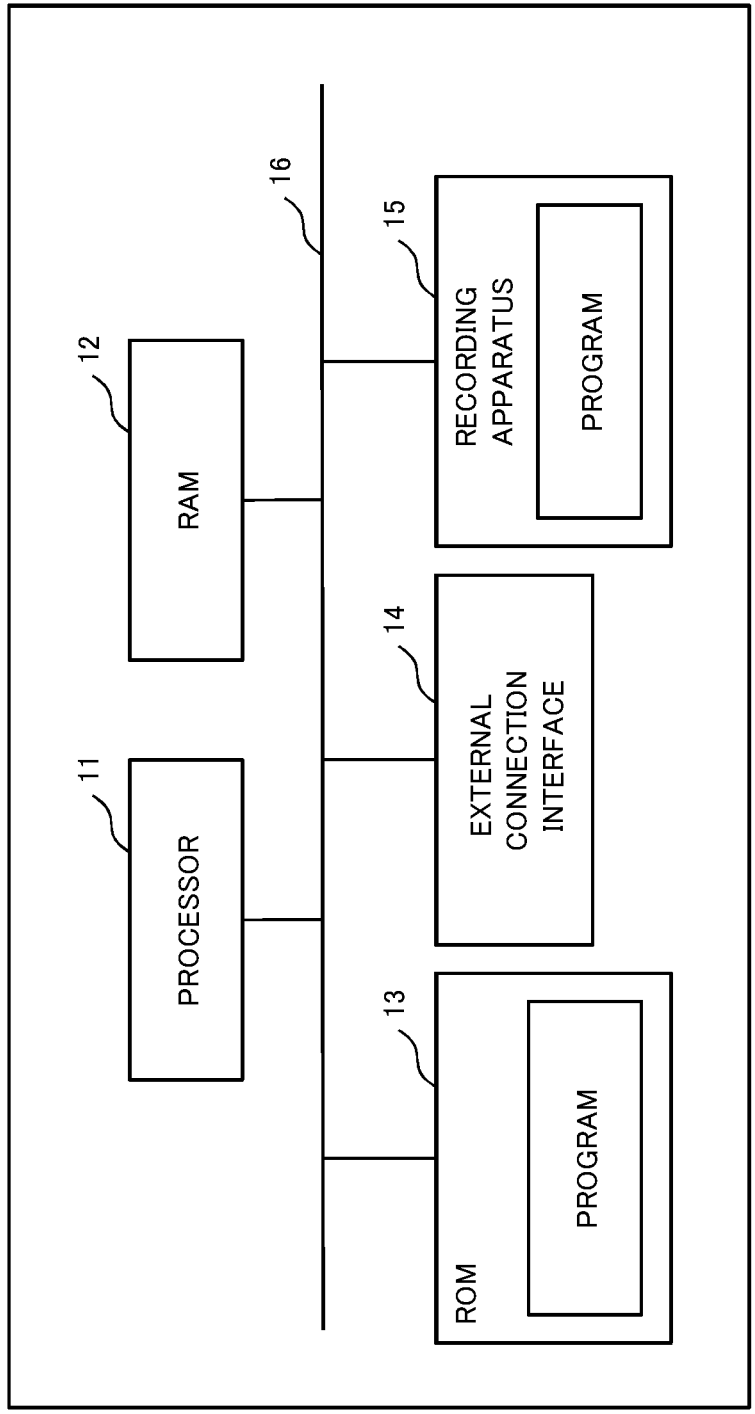

The units of the distribution apparatus 3, FW distribution apparatus 110 and FW substitute apparatus 120, which are shown in FIGS. 1 and 2, are implemented by hardware resources illustrated in FIG. 6. Specifically, the configuration shown in FIG. 6 includes a processor 11, a RAM (Random Access Memory) 12, a ROM (Read Only Memory) 13, an external connection interface 14, a recording apparatus 15 and a bus 16 connecting between the components of the configuration.

In each of the above-described exemplary embodiments, a description has been given of a case, as an example of execution by the processor 11 shown in FIG. 6, where a computer program capable of realizing the above-described functions is provided for the FW distribution apparatus 110 and the FW substitute apparatus 120 and, after that, the processor 11 reads the computer program into the RAM 12 and executes it to realize the functions. However, the function of each of the blocks in the distribution apparatus 3, FW distribution apparatus 110 and FW substitute apparatus 120, which are shown in FIGS. 1 and 2, may be partly or wholly implemented by hardware.

The computer program to be provided as above may be stored in a readable/writable memory (a temporary recording medium) or a computer readable storage device such as a hard disk device. In such a case, the present invention can be considered to be configured by code expressing the computer program or by a recording medium storing the computer program.

The present invention has been described above with reference to the above-described exemplary embodiments. However, the present invention is not limited to the exemplary embodiments. That is, the present invention can employ various aspects understandable to those skilled in the art, including a variety of combinations and selections of the presently disclosed factors described above, within the scope of the present invention.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further, it is noted that the inventor's intent is to retain all equivalents of the claimed invention even if the claims are amended during prosecution.

The invention claimed is:

1. A firmware distribution system comprising:
a first apparatus configured to send a firmware acquisition request and information regarding an installation location of the first apparatus;
a distribution apparatus configured to, when receiving the firmware acquisition request and the information regarding the installation location from the first apparatus via a network, distribute first firmware or second firmware depending on the information regarding the installation location to the first apparatus, the second firmware including the first firmware except a predetermined process of the first firmware, the first firmware includes functions needed to perform the first apparatus and, when receiving the first firmware, the first apparatus executes a process necessary to realize the functions of the first apparatus; and
a substitute apparatus separate from the first apparatus and the distribution apparatus,
wherein, when receiving the second firmware from the distribution apparatus, the first apparatus controls the substitute apparatus to execute the predetermined process of the first firmware and which is not included in the second firmware but included in the first firmware, the substitute apparatus being capable of communicating with the first apparatus via the network,
wherein the substitute apparatus, the first apparatus and the distribution apparatus are connected by the network,
wherein the second firmware includes only minimal functions determined in advance as access functions to a device group, and wherein, when receiving the second firmware from the distribution apparatus, the first apparatus executes a process of accessing a sensor included in the first apparatus, in response to an instruction from the substitute apparatus, and a process of sending data acquired as a result of executing the process of accessing, to the substitute apparatus, the process of accessing and the process of sending data being included in the second firmware.

2. The firmware distribution system according to claim 1, wherein
the substitute apparatus executes the predetermined process of the first firmware and which is not included in the second firmware but included in the first firmware and, when data acquired by a sensor included in the first apparatus is necessary, instructs the first apparatus to acquire the data.

3. A distribution apparatus comprising:
a storage unit configured to store in which information regarding an installation location of a first apparatus is associated with first firmware or second firmware depending on the installation location, the first apparatus being communicable via a network, the second firmware including the first firmware except a predetermined process of the first firmware; and
a determination unit configured to, when receiving from the first apparatus via the network a firmware acquisition request and information regarding the installation location of the first apparatus, determine whether to distribute the first firmware or to distribute the second firmware, to the first apparatus, based on received information regarding the installation location and the firmware information, the first firmware includes functions needed to perform the first apparatus and, when receiving the first firmware, the first apparatus executes a process necessary to realize the functions of the first apparatus,
wherein, when receiving the second firmware from the distribution apparatus, the first apparatus controls a substitute apparatus to execute the predetermined process of the first firmware and which is not included in the second firmware but included in the first firmware, the substitute apparatus being capable of communicating with the first apparatus via the network,
wherein the substitute apparatus is separate from the first apparatus and the distribution apparatus,
wherein a second firmware includes only minimal functions determined in advance as access functions to a device group, and
wherein, when receiving the second firmware from the distribution apparatus, the first apparatus executes a process of accessing a sensor included in the first apparatus, in response to an instruction from the substitute apparatus, and a process of sending data acquired as a result of executing the process of accessing, to the substitute apparatus, the process of accessing and the process of sending data being included in the second firmware.

4. A firmware distribution method comprising:
sending a firmware acquisition request and information regarding an installation location of a first apparatus from the first apparatus; and
when a distribution apparatus receives the firmware acquisition request and the information regarding the installation location from the first apparatus via a network, distributing first firmware or second firmware depending on the information regarding the installation location from the distribution apparatus, the second firmware including the first firmware except a predetermined process of the first firmware, the first firmware includes functions needed to perform the first apparatus and, when receiving the first firmware, the first apparatus executes a process necessary to realize the functions of the first apparatus,
wherein, when receiving the second firmware from the distribution apparatus, a first apparatus controls a substitute apparatus to execute the predetermined process of the first firmware and which is not included in the second firmware but included in the first firmware, the substitute apparatus being capable of communicating with the first apparatus via the network,
wherein the substitute apparatus is separate from the first apparatus and the distribution apparatus,
wherein the second firmware includes only minimal functions determined in advance as access functions to a device group, and
wherein, when receiving the second firmware from the distribution apparatus, the first apparatus executes a process of accessing a sensor included in the first apparatus, in response to an instruction from the substitute apparatus, and a process of sending data acquired as a result of executing the process of accessing, to the substitute apparatus, the process of accessing and the process of sending data being included in the second firmware.

5. The firmware distribution method according to claim 4, wherein
when the first apparatus receives the second firmware from the distribution apparatus, the first apparatus controls a substitute apparatus to execute the predetermined process of the first firmware and which is not included in the second firmware but included in the first firmware, the substitute apparatus being capable of communicating with the first apparatus via the network.

6. A non-transitory computer readable recording medium storing a program for causing a computer to execute:
a process of storing, into a storage unit, firmware information in which information regarding an installation location of a first apparatus is associated with first firmware or second firmware depending on the installation location, the first apparatus being communicable via a network, the second firmware including the first firmware except a predetermined process of the first firmware; and
a process of, when receiving from the first apparatus via the network a firmware acquisition request and information regarding the installation location of the first apparatus, determine whether to distribute the first firmware or to distribute the second firmware, to the first apparatus, based on received information regarding the installation location and the firmware information, the first firmware includes functions needed to perform the first apparatus and, when receiving the first firmware, the first apparatus executes a process necessary to realize the functions of the first apparatus,
wherein, when receiving the second firmware from a distribution apparatus, the first apparatus controls a substitute apparatus to execute the predetermined process which is not included in the second firmware but included in the first firmware, the substitute apparatus being capable of communicating with the first apparatus via the network,
wherein the substitute apparatus is separate from the first apparatus and the distribution apparatus, wherein the second firmware includes only minimal functions determined in advance as access functions to a device group, and wherein, when receiving the second firmware from the distribution apparatus, the first apparatus executes a process of accessing a sensor included in the first apparatus, in response to an instruction from the substitute apparatus, and a process of sending data acquired as a result of executing the process of accessing, to the substitute apparatus, the process of accessing and the process of sending data being included in the second firmware.

* * * * *